Patented Apr. 1, 1947

2,418,115

UNITED STATES PATENT OFFICE 2,418,115

ORGANOMETALLIC COMPOUNDS CONTAINING 1,3,5-TRIAZINE RINGS

Ernst A. H. Friedheim, New York, N. Y.

No Drawing. Application October 16, 1943,
Serial No. 506,564

6 Claims. (Cl. 260—242)

This invention relates to therapeutically active compounds containing a 1,3,5-triazine ring linked by a nitrogen-containing bridge to an aromatic organic radical containing antimony and to methods of preparing such compounds. It has particular relation to 1,3,5-triazine derivatives in which at least one carbon atom of the triazine ring is linked by a —NH— group to a phenyl-stibonic acid radical.

The compounds according to the present invention correspond to the general formula

I

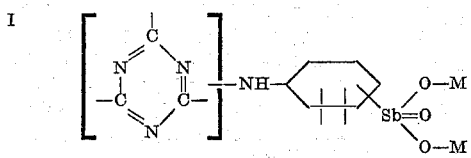

said formula representing a new compound consisting of a 1,3,5-triazine ring, at least one ring carbon atom of which is linked by a —NH— group to a phenyl-stibonic acid radical or a substituted phenyl stibonic acid radical wherein M is selected from the group consisting of hydrogen and salt-forming atoms and radicals.

In carrying out the present invention 1,3,5-triazine compounds may be obtained which correspond to the formula

II

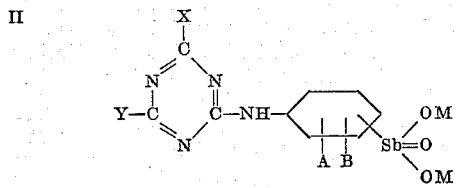

wherein X and Y may be equal or different and may represent halogens or residues of any inorganic or organic, aliphatic or cyclic, isocyclic or heterocyclic, monocyclic or polycyclic molecule containing an active hydrogen atom capable of reacting with a cyanuric halide with the formation of hydrogen halide. For example, X and Y may be selected from the group consisting of Cl, Br, I, F, H, —OH, —O—alkyl, —O—acyl, —NH$_2$, —NH—alkyl, —N—alkyl$_2$, —NH—acyl —NH—NH$_2$, —NH—NH—alkyl, —N—alkyl—NH$_2$ —N—alkyl—NH—alkyl, —NH—NH—acyl —N—acyl—NH$_2$, —N—acyl—NH—acyl —NH—aryl, —NH(CH$_2$)$_n$CONH$_2$ —NH(CH$_2$)$_n$NH$_2$ —NH(CH$_2$)$_n$NH—alkyl —NH(CH$_2$)$_n$N—dialkyl, —NH(CH$_2$)$_n$OH

—NH.CH$_2$CHOHCH$_2$OH, —NHOH, —NHCN

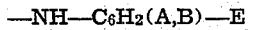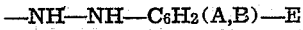

residues of cyanamide derivatives, residues of substituted guanidines, amino-derivatives of carbohydrates, particularly amino-derivatives of monosaccharides, such as glucose-amine, —SH, substituents of the type —S—R wherein R stands for any aliphatic or cyclic group capable of carrying a —SH group, such as thioglycolic acid and thiophenol, alkyl radicals and their substitution products, isocyclic and heterocyclic radicals, which may be monocyclic or polycyclic, and their substitution products, such as O—aryl groups, substituted aryl radicals, such as those corresponding to the formula

—NH—C$_6$H$_2$(A,B)—E

—NH—NH—C$_6$H$_2$(A,B)—E wherein A and B may represent equal or different substituents defined further below, and E may represent a radical being in ortho, meta or para-position to the —NH— or —NH—NH— group, and selected from the group consisting of —SO$_3$H, —SO$_2$NH$_2$, —COOH. X and/or Y may also stand for radicals of the formula

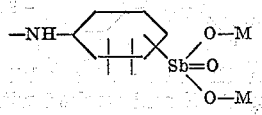

or for 1,3,5-triazine groups or residues of triazine derivatives. These radicals and triazine groups or residues of triazine derivatives may be linked directly or indirectly to the ring carbon atoms of the first triazine ring. In the latter case the link between the substituting radical and the ring carbon atom of the first triazine ring may be formed by a cyclic or aliphatic amine radical, f. e. by an —NH—aryl, —NH—alkyl, —NH—NH—aryl or —NH—NH—alkyl radical. The link between the first and the substituting triazine ring may be formed by an —NH—, —NH—NH— group or an aliphatic or cyclic diamine, f. e. of the formula —NH—C$_6$H$_4$—NH— or —NH—CH$_2$—CH$_2$—NH—.

A and B may be the same or different and are selected from the group consisting of hydrogen, halogen, —NO$_2$, —OH, —O—alkyl, amino-, substituted amino-, and alkyl radicals. The stibonic acid radical may be in ortho-, meta- or para-position with respect to the —NH— group.

The compounds embodying the present invention may be prepared by reacting a derivative of 1,3,5-triazine containing at least one active halogen with an aminophenyl-stibonic acid compound. The compounds according to the invention may also be obtained by reacting a halogen-phenyl-stibonic acid compound with a triazine derivative containing at least one amino-group with active hydrogen.

*Example I.*—A solution of 28.6 parts by weight of sodium-p-amino-phenyl-stibinate in 200 parts by weight of water is added dropwise to a fine suspension of 18.3 parts by weight of cyanuric chloride (2,4,6-trichloro-1,3,5-triazine) in 500 parts by weight of water in the course of 1 hour while cooling and stirring vigorously. After this time the primary aromatic amine has disappeared. The reaction mixture is acidified with dilute HCl and the reaction product which forms a white suspension is filtered off, washed with water and then with acetone.

The resulting p-[2,4-dichloro-1,3,5-triazinyl-(6)]-aminophenyl-stibonic acid of the formula

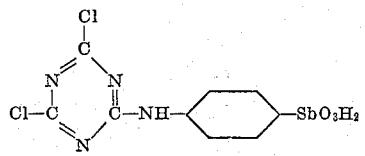

is a white powder insoluble in cold water, which can be dissolved in dilute aqueous solutions of alkali hydroxides. The compound is insoluble in alcohol, ether, benzene. The solution in concentrated sulphuric acid is colorless.

*Example II.*—The moist p-[2,4-dichloro-1,3,5-triazinyl-(6)]-aminophenyl-stibonic acid obtained in accordance with Example I is covered with 100 times the quantity of 10% ammonia and shaken at 45° C. for 1 hour, whereby the product goes into complete solution. The excess ammonia is removed under reduced pressure. On acidification with acetic acid p-[2-chloro-4-amino-1,3,5-triazinyl-(6)]-aminophenyl-stibonic acid of the formula

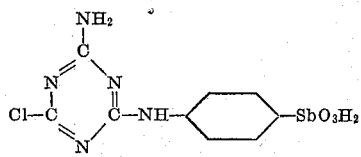

is isolated in the form of a white precipitate which is filtered off and washed with water and acetone.

The resulting compound is soluble in aqueous solutions of alkali hydroxides. It is insoluble in water, alcohol, ether and benzene.

*Example III.*—The moist p-[2,4-dichloro-1,3,5-triazinyl-(6)]-aminophenyl-stibonic acid prepared in accordance with Example I is heated in an autoclave under pressure to 110–130° C. for about two hours with 10 times the quantity of 25% ammonia. When excess ammonia has been driven off, the reaction mixture is acidified in the cold with hydrochloric acid, whereupon the p-[2,4-diamino-1,3,5-triazinyl-(6)]-aminophenyl-stibonic acid of the formula

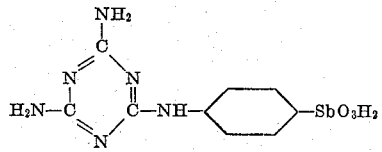

separates as a white precipitate. It is separated and washed with cold water. The compound is soluble in dilute aqueous solutions of alkali hydroxides and aqueous diethylamine solutions.

The reaction of p-[2,4-dichloro-1,3,5-triazinyl-(6)]-aminophenyl-stibonic acid with ammonia may also take place in an open vessel and yields p-[2,4-diamino-1,3,5-triazinyl-(6)]-aminophenyl-stibonic acid.

*Example IV.*—29 parts by weight of chloro-cyanuric-diamide are boiled for about 2 hours under reflux with a solution of 28.6 parts by weight of sodium aminophenyl stibinate in 300 parts by weight of water whereupon the stibanilic acid disappears. The white reaction product is brought into solution by the addition of ammonia. p-[2,4-diamino-1,3,5-triazinyl-(6)]-aminophenyl-stibonic acid is precipitated from the filtered solution by sulphuric acid.

*Example V.*—10 parts by weight of a 17% solution of methyl-amine are poured over 1 part by weight of p-[2,4-dichloro-1,3,5-triazinyl-(6)]-aminophenyl-stibonic acid obtained in accordance with Example I whereby solution sets in with evolution of heat. The solution is boiled until the excess of methylamine is driven off. Sufficient hydrochloric acid is then added to render the product just acid to congo paper upon which p-[2,4-di-methylamino-1,3,5-triazinyl-(6)]-amino-phenyl-stibonic acid of the formula

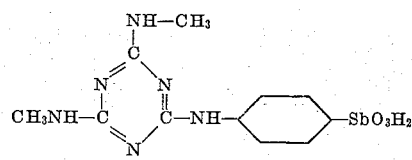

separates as a white precipitate. This precipitate is separated and washed with cold water.

The p-[2,4-dichloro-1,3,5-triazinyl-(6)]-amino-phenyl-stibonic acid may be reacted in a substantially similar manner with other alkyl amines, dialkyl amines, hydroxy-alkyl amines and dialkyl-amino-alkyl amines.

Instead of p-aminophenyl-stibonic acid, its derivatives or isomers, such as 4-oxy-3-amino-phenyl-stibonic acid-(1), or 2-oxy-4-amino-phenyl-stibonic acid may be employed in carrying out the process described in the above Examples I–V.

*Example VI.*—A preferred embodiment of the process for preparing 2,4-diamino-1,3,5-triazinyl-aminophenyl-stibonic acid consists in the following steps:

A solution containing 65.7 g. of the disodium salt of aminophenyl-stibonic acid in 800 cc. of water is run dropwise and with vigorous stirring into a suspension prepared by running a solution of 45 g. of freshly distilled cyanuric chloride in 200 cc. of acetone into a mixture of 450 cc. of water, 450 g. of ice and 3 cc. of a suitable wetting agent, such as octyl alcohol. The temperature of the reaction mixture is kept between −5° and −2° C., and the pH between 6 and 7. After all aminophenyl stibonic acid has disappeared from the reaction mixture, i. e. when tests for diazotable amine have become negative, 1100 cc. of 28% aqueous ammonia are added, the temperature being allowed to rise to 10° C., and the reaction mixture is saturated with $NH_3$ gas. The reaction mixture is now heated slowly within 2 hours to 94° C., and subsequently charcoaled and filtered. The clear filtrate is cooled and saturated with carbon dioxide gas. A white precipitate is formed which is filtered off and washed with ice water saturated with carbon dioxide. For purification, the precipitate is dissolved in 10 times its weight of 6% aqueous diethylamine. This solution is charcoaled, filtered, and pure 2,4-diamino-1,3,5-triazinyl-aminophenyl-stibonic acid is precipitated by saturation of the solution with $CO_2$ gas.

Precipitation may also be effected by acidifying the solution by means of another anhydrous, gaseous acidifying agent, such as $SO_2$ or HCl.

The compound thus obtained is moderately soluble in aqueous ammonia, aqueous diethylamine, dilute potassium carbonate and potassium hydroxide solution, and to a lesser degree in aqueous sodium carbonate and sodium hydroxide solution. It is sparingly soluble in boiling glacial acetic acid, but practically insoluble in dilute acetic acid. A potassium salt can be obtained by saturating a solution of the new compound in an excess of aqueous potassium hydroxide with potassium acetate.

Further compounds embodying the present invention, in which X and/or Y stands for a radical other than those described in the above examples, may be obtained, for example, by first preparing an X-Y-triazine compound, in which at least one carbon atom of the triazine ring is directly linked to a halogen, and reacting such triazine compound with a suitable compound of the formula

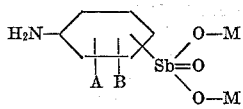

The reaction between the X-Y-triazine-halogen compound and the aminophenyl-stibonic acid of the above formula may be carried out in a manner analogous to that described in the foregoing examples.

Furthermore, substances embodying the present invention may also be obtained by reacting a compound corresponding to the general formula

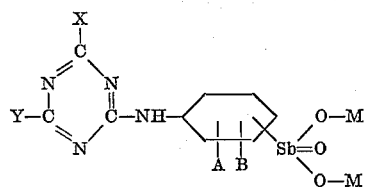

and containing as X and/or Y active groups, f. e. halogen, with any compound capable of combining with or replacing X and/or Y. A compound of the formula

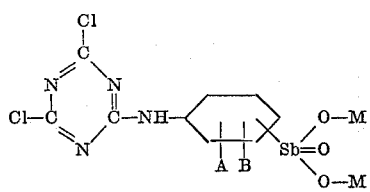

may be reacted, for example, with a compound of the formula

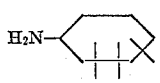

Compounds embodying this invention and carrying A, B substituents other than those described in the foregoing examples, may be obtained by a procedure substantially analogous to the procedure described in said examples.

In preparing aqueous solutions for injections of the 1,3,5-triazine-aminophenyl-stibonic acid compounds according to this invention for medical use, I have found that said acid compounds can be preferably dissolved in an aqueous solution containing potassium hydroxide in an amount less than that corresponding to the equivalent amount. A solution adapted to be used for injections may be, for example, prepared by dissolving 2,4-diamino-1,3,5-triazinyl-aminophenyl-stibonic acid in an aqueous solution containing ⅔ to ¾ of the equivalent amount of KOH corresponding to the mono-potassium salt. In acid medium the 1,3,5-triazine-aminophenyl-stibonic acid compounds may be transformed into polymerization products which are probably formed from 2 or more molecules of said compounds with elimination of water.

The new compounds according to the present invention have a high curative effect and a high therapeutic index amounting up to 20 in experimental trypanosomiasis (trypanosoma equiperdum) in the mouse. They show, furthermore, in the same disease a remarkable prophylactic effect. Mice having received a single application of a well-tolerated dose of said compounds, are found to be protected 14 days or more after said application against an experimental infection, which kills untreated controls within 3 to 4 days. Mice treated in this way show markedly increased resistance to an experimental infection with trypanosoma equiperdum for up to 3-4 months. No organo-metallic therapeutic agent described up to date is known to have a similar effect.

It will be understood that this invention may be carried out in other specific ways than those herein set forth, and the examples should be, therefore, considered as illustrative and not restrictive within the spirit of the invention as defined in the appended claims. The terms "amino radicals" and "hydrazino radicals" are used to include also the above disclosed substituted amino and substituted hydrazino radicals.

Reference is made to my co-pending application Ser. No. 459,636 filed on September 25, 1942, of which this is a continuation-in-part.

I claim:

1. A 1,3,5-triazine compound of the following formula

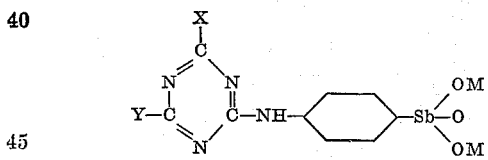

in which M is a monovalent cation and X and Y are radicals selected from the group consisting of amino and halogen.

2. A 2,4-diamino-1,3,5-triazinyl-aminophenyl stibonic acid compound of the formula

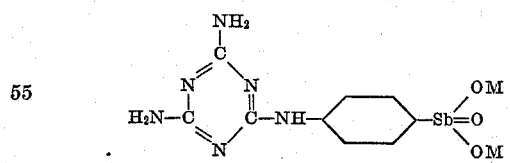

wherein M stands for a monovalent cation.

3. In a process for the preparation of p-[2,4-diamino - 1,3,5 - triazinyl-(6)]-aminophenyl-stibonic acid compound, the step of reacting an aqueous solution of a salt of aminophenyl-stibonic acid with an aqueous suspension of cyanuric chloride in the presence of a wetting agent at a temperature slightly below 0° C., adding, after the disappearance of the aminophenyl-stibonic acid salt in the solution, aqueous ammonia to the solution at a temperature below 10° C., saturating the solution with H₃N gas and heating the solution, and precipitating the compound formed in cooled solution by means of an acid.

4. In a process for the preparation of p-[2,4-diamino - 1,3,5 - triazinyl-(6)]-aminophenyl-stibonic acid compound, the step of reacting an aqueous solution of a salt of aminophenyl-stibonic acid with an aqueous suspension of cyanuric chloride in the presence of octyl alcohol at a temperature slightly below 0° C., adding, after the disappearance of the aminophenylstibonic acid salt in the solution, aqueous ammonia to the solution at a temperature below 10° C., saturating the solution with $H_3N$ gas and heating the solution, and acidifying the cooled solution by means of an anhydrous acidifying agent.

5. A process as claimed in claim 3, in which precipitation is effected by the introduction of gaseous $CO_2$ into the reaction solution.

6. A process as claimed in claim 3, in which precipitation is effected by the introduction of gaseous $SO_2$ into the reaction solution.

ERNST A. H. FRIEDHEIM.

REFERENCES CITED

The following references are of record in the file of this patent:

UNITED STATES PATENTS

| Number | Name | Date |
|---|---|---|
| 1,873,668 | Schmidt | Aug. 23, 1932 |
| 2,250,553 | Ruskin | July 29, 1940 |
| 2,259,492 | Ruskin | Oct. 21, 1941 |

FOREIGN PATENTS

| Number | Country | Date |
|---|---|---|
| 537,690 | British | July 1941 |
| 214,903 | Swiss | Aug. 16, 1941 |

OTHER REFERENCES

"Textbook of Medicine," by Cecil, 5th edition, 1941, page 441. (Copy in Division 43.)

Sollman, "Manual of Pharmocology," 6th edition, page 1060. (Copy in Division 43.)